(12) United States Patent
Essaki et al.

(10) Patent No.: US 10,615,410 B2
(45) Date of Patent: Apr. 7, 2020

(54) ACTIVE MATERIAL FOR NONAQUEOUS ELECTROLYTE BATTERY, ELECTRODE FOR NONAQUEOUS ELECTROLYTE BATTERY, NONAQUEOUS ELECTROLYTE SECONDARY BATTERY, BATTERY PACK, METHOD OF MANUFACTURING ACTIVE MATERIAL FOR NONAQUEOUS ELECTROLYTE BATTERY, AND VEHICLE

(71) Applicant: Kabushiki Kaisha Toshiba, Minato-ku (JP)

(72) Inventors: Kenji Essaki, Kawasaki (JP);
Tomokazu Morita, Funabashi (JP);
Takayuki Fukasawa, Yokohama (JP);
Takashi Kuboki, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 235 days.

(21) Appl. No.: 15/256,089

(22) Filed: Sep. 2, 2016

(65) Prior Publication Data
US 2016/0372744 A1 Dec. 22, 2016

Related U.S. Application Data

(63) Continuation of application No. PCT/JP2014/057741, filed on Mar. 20, 2014.

(51) Int. Cl.
*H01M 4/36* (2006.01)
*H01M 4/48* (2010.01)
(Continued)

(52) U.S. Cl.
CPC ......... *H01M 4/366* (2013.01); *H01M 2/1077* (2013.01); *H01M 4/0471* (2013.01);
(Continued)

(58) Field of Classification Search
CPC ..... H01M 4/366; H01M 4/386; H01M 4/0471
See application file for complete search history.

(56) References Cited

U.S. PATENT DOCUMENTS 9,997,772 B2 * 6/2018 Niimi ...................... C01B 33/32
2004/0106040 A1 6/2004 Fukuoka et al.
(Continued)

FOREIGN PATENT DOCUMENTS

EP 0 867 958 A1 9/1998
JP 6-256076 A 9/1994
(Continued)

OTHER PUBLICATIONS

International Search Report dated Jul. 1, 2014 in PCT/JP2014/057741, filed on Mar. 20, 2014.

*Primary Examiner* — Ula C Ruddock
*Assistant Examiner* — Thomas H. Parsons
(74) *Attorney, Agent, or Firm* — Oblon, McClelland, Maier & Neustadt, L.L.P.

(57) ABSTRACT

An active material of an embodiment for a nonaqueous electrolyte battery includes a complex. The complex includes a covering material including an M-O—C mixed body; and particles including at least one element of M. The particles are included in the covering material. The M includes at least one element selected from the group consisting of; Si, Sn, Al, and Ti. The particles including the at least one element of M include the at least one element of M or an alloy including the at least one element of M. The M-O—C mixed body includes at least three elements of M, O, and C. The M-O—C mixed body includes a point at which the following conditional expressions: $0.6 \leq M/O \leq 5$ (molar ratio) and $0.002 \leq M/C \leq 0.1$ (molar ratio) are simultaneously satisfied. The M-O—C mixed body includes the at least three elements of M, O, and C in a region excluding the particles including the at least one element of M when (Continued)

elementary composition analysis of the complex is performed by TEM-EDX with a beam diameter of 1 nm.

17 Claims, 7 Drawing Sheets

(51) Int. Cl.

| | | |
|---|---|---|
| *H01M 4/62* | (2006.01) | |
| *H01M 4/38* | (2006.01) | |
| *H01M 4/04* | (2006.01) | |
| *H01M 4/13* | (2010.01) | |
| *H01M 2/10* | (2006.01) | |
| *H01M 10/0525* | (2010.01) | |
| *H01M 4/66* | (2006.01) | |
| *H01M 10/052* | (2010.01) | |

(52) U.S. Cl.
CPC .............. *H01M 4/13* (2013.01); *H01M 4/386* (2013.01); *H01M 4/483* (2013.01); *H01M 4/62* (2013.01); *H01M 4/628* (2013.01); *H01M 10/0525* (2013.01); *H01M 4/661* (2013.01); *H01M 10/052* (2013.01); *H01M 2220/20* (2013.01); *Y02E 60/122* (2013.01)

(56) References Cited

U.S. PATENT DOCUMENTS

| | | | |
|---|---|---|---|
| 2009/0162750 A1 | | 6/2009 | Kawakami et al. |
| 2012/0115033 A1 | | 5/2012 | Kim et al. |
| 2013/0078490 A1 | * | 3/2013 | Morita .................. H01M 4/133 429/92 |

FOREIGN PATENT DOCUMENTS

| | | | |
|---|---|---|---|
| JP | 10-275617 | | 10/1998 |
| JP | 2003-197191 | | 7/2003 |
| JP | 2003-197193 | | 7/2003 |
| JP | 2003197191 | * | 7/2003 |
| JP | 2004-178917 | | 6/2004 |
| JP | 2005-235589 | | 9/2005 |
| JP | 2005-347076 | | 12/2005 |
| JP | 2009-164104 | | 7/2009 |
| JP | 2010-118330 | | 5/2010 |
| JP | 2011-26153 A | | 2/2011 |
| JP | 2011-119263 | | 6/2011 |
| JP | 2012-99341 | | 5/2012 |
| JP | 2012-99452 | | 5/2012 |
| JP | 2012-151129 | | 8/2012 |
| JP | 2013-73764 | | 4/2013 |
| JP | 2013-131325 | | 7/2013 |

* cited by examiner

ACTIVE MATERIAL FOR NONAQUEOUS ELECTROLYTE BATTERY, ELECTRODE FOR NONAQUEOUS ELECTROLYTE BATTERY, NONAQUEOUS ELECTROLYTE SECONDARY BATTERY, BATTERY PACK, METHOD OF MANUFACTURING ACTIVE MATERIAL FOR NONAQUEOUS ELECTROLYTE BATTERY, AND VEHICLE

CROSS-REFERENCE TO RELATED APPLICATION

This application is a continuation application based upon and claims the benefit of priority from International Application PCT/JP2014/057741, the International Filing Date of which is Mar. 20, 2014 the entire contents of which are incorporated herein by reference.

FIELD

Embodiments described herein relate to an active material for nonaqueous electrolyte battery, electrode for nonaqueous electrolyte battery, nonaqueous electrolyte secondary battery, battery pack, method of manufacturing active material for nonaqueous electrolyte battery, and vehicle.

BACKGROUND

Recently, various types of portable electronic devices have been gradually widespread according to rapid development of miniaturization techniques for electronics devices. Batteries that are power supplies of these portable electronic devices are required to be miniaturized. A nonaqueous electrolyte secondary battery having high-energy density has attracted attention.

In particular, attempts to use elements to be alloyed with lithium, such as silicon and tin, and a material, such as amorphous chalcogen compound, having large lithium occlusion capacity and high density, have been made. Particularly, silicon can occlude lithium by a ratio of 4.4 atoms of lithium to one atom of silicon. Negative electrode capacity per mass is approximately ten times that of graphite carbon. However, silicon has a problem with cycle characteristics, such as pulverization of active material particles, due to a large variation of volume in accordance with insertion and separation of lithium in a charge and discharge cycle.

As a result of eager experiments, the present inventors have found that an active material dispersed in a carbonaceous substance can be obtained in a state where microcrystalline silicon has been included in or retained by silicon oxide firmly bonding with silicon, in the minute active material including silicon monoxide and the carbonaceous substance complexed and calcined. The present inventors have found that large capacity and improvement of the cycle characteristics can be achieved. However, when several hundred charge and discharge cycles are performed to this type of active material, the capacity degrades. Thus, the cycle characteristics are insufficient for use during a long period.

In order to solve this problem, the present inventors have thought that properties of the carbonaceous substance have a large influence with respect to the cycle characteristics. The present inventors have examined that another material is used instead of the carbonaceous substance. This type of material is required to have conductivity and is also required to be a material that disperses particles containing the above type of microcrystalline silicon, inside.

DETAILED DESCRIPTION

Figure 1:
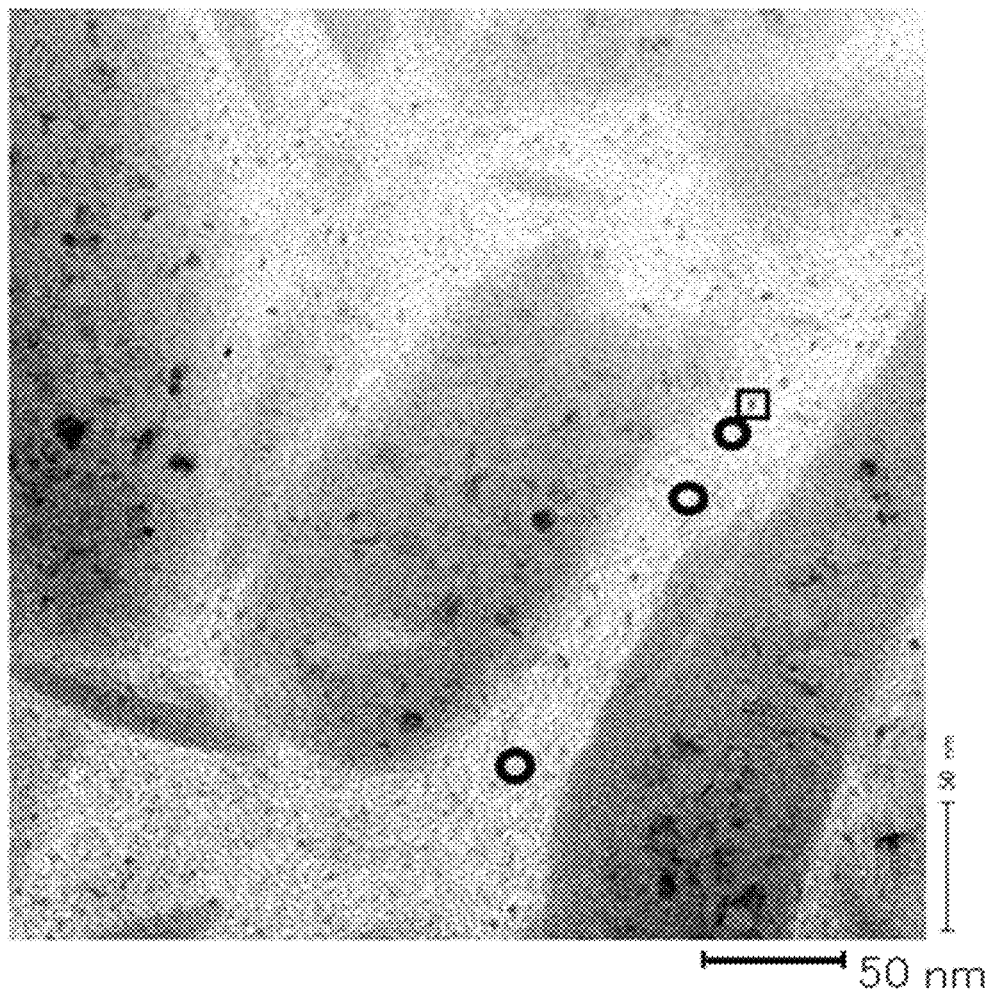
FIG. 1 is a photographed image of a section of an active material according to a first embodiment (Example 1) with a transmission electron microscope.

An active material of an embodiment for a nonaqueous electrolyte battery includes a complex. The complex includes a covering material including an M-O—C mixed body; and particles including at least one element of M. The particles are included in the covering material. The M includes at least one element selected from the group consisting of; Si, Sn, Al, and Ti. The particles including the at least one element of M include the at least one element of M or an alloy including the at least one element of M. The M-O—C mixed body includes at least three elements of M, O, and C. The M-O—C mixed body includes a point at which the following conditional expressions: $0.6 \leq M/O \leq 5$ (molar ratio) and $0.002 \leq M/C \leq 0.1$ (molar ratio) are simultaneously satisfied. The M-O—C mixed body includes the at least three elements of M, O, and C in a region excluding the particles including the at least one element of M when elementary composition analysis of the complex is performed by TEM-EDX with a beam diameter of 1 nm.

First Embodiment

An active material according to a first embodiment is a complex including a covering material and particles. The covering material includes an M-O—C mixed body. The particles including at least one element of M are included in the covering material. The M includes the at least one element selected from the group consisting of; Si, Sn, Al, and Ti. The active material to be used for a negative electrode will be given in the descriptions of the embodiment below. The active material may be used for a positive electrode. An electrode using the active material, to be used for a nonaqueous electrolyte secondary battery, will be described. The electrode using the active material according to the embodiment, can be used for various types of batteries.

The M-O—C mixed body (Si—O—C, Sn—O—C, Al—O—C, and Ti—O—C) includes at least three elements of M, O, and C. The M includes the at least one element selected from the group consisting of; Si, Sn, Al, and Ti. The M-O—C mixed body is not a compound, but includes a material including the three types of elements of M, O, and C mixed in an atomic state. The M-O—C mixed body is preferably present around the particles including the element of M. The M-O—C mixed body has a form mixed in the atomic state. Thus, it is thought that the M-O—C mixture contributes to improvement of cycle characteristics by relaxing stress accompanied with a variation of volume due to charge and discharge of a battery. As the element of M, exemplary Si will be described below. Note that even in a case where the M includes Sn, Al, Ti, or at least two elements selected from the group consisting of; Si, Sn, Al, and Ti, the descriptions for the element of M other than Si, will be omitted in details shared with Si.

An Si—O—C mixed body has a high affinity for silicon-containing particles. Cycle characteristics of the Si—O—C mixed body tend to be high in comparison to a covering with a carbonaceous substance.

For example, in a case where a negative electrode active material includes the silicon-containing particles dispersed in the carbonaceous substance having no Si—O—C mixed body, when the silicon-containing particles together with minute silicon oxide are dispersed in the carbonaceous substance, as a form of a compound, the carbonaceous substance portion except the silicon-containing particle portion includes the three elements of Si, O, and C. However, an effect similar to that according to the embodiment is not achieved in this case. The reason for this is described as below. In a case where the silicon generates a large variation of volume during a process of charge and discharge and also stress caused by the variation influences a region covering the circumference of the silicon-containing particles, when the region covering the circumference has high unevenness, a load due to the stress easily, locally gathers. Thus, destruction of the negative active material easily progresses. Therefore, a material covering the circumference of the silicon-containing particles is preferably a mixed body mixed in the atomic state, similarly to the embodiment.

After the negative electrode including the negative electrode active material according to the embodiment is manufactured and then the manufactured negative electrode is made to be flaky by an ion milling method, using energy dispersive X ray spectrometry (transmission electron microscope-energy dispersive X-ray spectrometry (TEM-EDX)) can ascertain that the material around the silicon-containing particles is the Si—O—C mixed body. Specifically, the silicon-containing particles and a portion except the silicon-containing particles are grasped by an observation of the inside of the negative electrode active material with TEM. Then, EDX performs elementary composition analysis to the portion except the silicon-containing particles by point analysis. FIG. 1 illustrates a TEM image of the negative electrode active material. As illustrated in FIG. 1, the silicon-containing particles are indicated with a deep color. The portion except the silicon-containing particles is indicated with a light color. For example, an acceleration voltage of 200 kV and a beam diameter of approximately 1 nm are preferable in analytical conditions. As a result of the analysis, when a point including at least the three elements of Si, O, and C is present in the portion except the silicon-containing particles, it is determined that the point is the Si—O—C mixed body.

Actually, as indicated with a circle in FIG. 1, at least three points except the silicon-containing particles are examined. Then, it is preferable to ascertain whether the point including the three elements of Si, O, and C is present. In this manner, an error that selects the portion of the silicon-containing particles as a measurement point due to failed adjustment of contrast control of a captured image can be avoided. Regarding the selection of the three points, as illustrated in FIG. 1, the three points may be selected near the center interposed between two silicon-containing particles adjacent in no contact with each other. Alternatively, three pairs of two silicon-containing particles adjacent in no contact with each other may be selected from different regions. Then, a point at the center interposed between the silicon-containing particles in each of the three pairs of silicon-containing particles, may be selected.

In the Si—O—C mixed body according to the embodiment, the rate of the Si is a sufficient amount for acquiring an effect of the improvement of the cycle characteristics, in terms of the relaxation of the stress due to the variation of volume. In addition, the rate of Si is in a range in which influence of the variation of volume due to charge and discharge of an Si atom is not conspicuous. That is, the Si—O—C mixed body preferably satisfies the following both conditional expressions: $0.6 \leq Si/O \leq 5$ (molar ratio) and $0.002 \leq Si/C \leq 0.1$ (molar ratio) The Si/O preferably satisfies the following conditional expression: $0.8 \leq Si/O \leq 4.5$ (molar ratio) The Si/C more preferably satisfies the following conditional expression: $0.004 \leq Si/C \leq 0.091$ (molar ratio) Note that, the Si/O and the Si/C are analyzed by a method the same as that of determining the Si—O—C mixed body. The ratios between Si, O, and C are calculated based on an analytical result. In a case where the M includes at least two types of elements in the ranges in which the Si/O and the Si/C are preferable, the sum of the respective elements preferably satisfies the above ranges.

In a case where the Si/O (molar ratio) is smaller than 0.6, the effect of the Si atom included in the mixed body is not sufficiently achieved. Thus, the effect of the improvement of the cycle characteristics is not obtained. Meanwhile, in a case where the Si/O (molar ratio) is larger than 5, influence of occurrence of the local variation of volume becomes severe due to the charge and discharge caused by the Si in the Si—O—C mixed body. Thus, the effect of the improvement of the cycle characteristics is not obtained.

In a case where the Si/C (molar ratio) is smaller than 0.002, the effect of the Si atom included in the mixed body is not sufficiently achieved. Thus, the effect of the improvement of the cycle characteristics is not obtained. Meanwhile, in a case where the Si/C (molar ratio) is larger than 0.1, the influence of the occurrence of the local variation of volume becomes severe due to the charge and discharge caused by the Si in the Si—O—C mixed body. Thus, the effect of the improvement of the cycle characteristics is not obtained.

In each measurement for the Si/O and the Si/C, at least three points except the silicon-containing particles are preferably examined as the number of measurement points, similarly to the above determination of the Si—O—C mixed body. Determination is preferably made with an average of the at least three points. Note that, in a TEM observation, a crystal lattice or a material that indicating a deep color similar to that of the silicon-containing particles are sometimes observed in a minute region in the Si—O—C mixed body. This is because a part of the silicon-containing particles or a part of a material of a precursor thereof is pulverized or detached so as to be separated when raw materials are mixed. When this point is included in the above measurement points, the average considerably varies. Therefore, when three points or more are measured, in a case where at least one point at which the Si/O is out of the above range or the Si/C is out of the above range is included regardless of at least one point included at which both the Si/O and the Si/C are in the above ranges, the measurement point of the at least one point out of the above ranges is changed. Then, measurement is performed again.

In a case where the negative electrode active material includes an Si—O—C compound, the compound functions as an active material assuming a charge and discharge reaction. In this case, the content rate of the Si in the Si—O—C compound increases due to charge and discharge capacity. Thus, the above ratios according to the embodiment are not satisfied.

The Si—O—C mixed body according to the embodiment is preferably amorphous. It can be determined that the Si—O—C mixed body is amorphous, based on no occurrence of a crystal lattice in the TEM image. Note that, the crystal lattice is sometimes observed in a minute region in the Si—O—C mixed body. This is because a part of the silicon-containing particles or a part of the material of the precursor thereof is pulverized or detached so as to be separated when the raw materials are mixed. The crystal lattice is treated as a material different from the Si—O—C mixed body.

The covering material may further include a carbonaceous substance. In a case where the covering material includes the carbonaceous substance, the carbonaceous and the Si—O—C mixed body are mixed. Examples of the carbonaceous substance that can be used include at least one material selected from the group consisting of; graphite, hard carbon, soft carbon, amorphous carbon, a carbon nanofiber, a carbon nanotube, and carbon black. These are preferable in that these increases conductivity of the active material or in that, as interior skeletons of the active material, these easily inhibit the active material particles from being deformed upon the charge and discharge.

The silicon-containing particles included in the negative electrode active material according to the embodiment, include silicon or an alloy including silicon, and may further include silicon oxide. The silicon-containing particles preferably include crystalline silicon. Examples of the silicon-containing particles include a form including a silicon oxide phase in a carbonaceous substance and a silicon phase in the silicon oxide phase, and a form including a complex including silicon particles covered with silicon oxide and silicon carbide in a carbonaceous substance. The volume ratio of the silicon-containing particles to the covering material is preferably larger than 0.33 and is preferably smaller than 2.5. In a case where the volume ratio is smaller than 0.33, difference between the silicon-containing particles and graphite carbon is barely obtained in terms of battery capacity. In a case where the volume ratio is larger than 2.5, the cycle characteristics decreases. Thus, the negative electrode active material becomes unsuitable for practical use.

Lithium silicate such as $Li_4SiO_4$, may be dispersed in the covering material, a surface and the inside of silicon oxide. For example, the negative electrode active material and lithium salt are mixed and subjected to heat treatment. Thus, a reaction between silicon oxide and the lithium salt occurs, and lithium silicate can be formed. Examples of the lithium salt include lithium hydroxide, lithium acetate, lithium oxide, and lithium carbonate. Other additives may be included in the covering material.

(Manufacturing Method)

Figure 2:
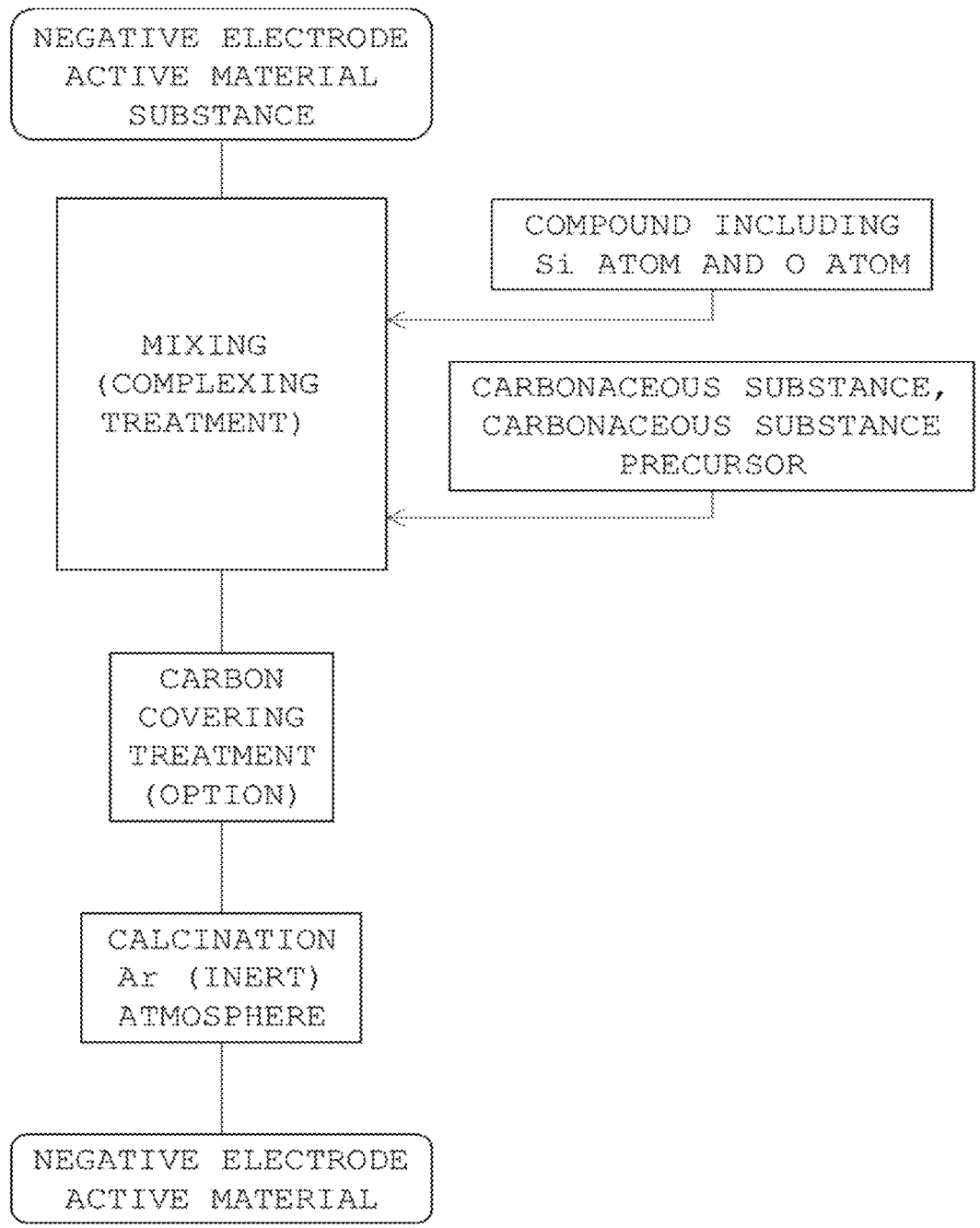
FIG. 2 is a process flow chart of a method of manufacturing the active material according to the first embodiment.

Next, a method of manufacturing the negative electrode active material will be described. In the method of manufacturing the active material, particles including at least M and a compound including at least an M atom and an O atom, are mixed in a liquid phase with a dispersion medium. Then, the mixture is calcined after dehydration and solidification. The M includes at least one element selected from the group consisting of; Si, Sn, Al, and Ti. A process flow chart in FIG. 2 illustrates this procedure. A negative electrode active material substance, the compound including at least an Si atom and an O atom (compound including at least an M atom and an O atom), and, as necessary, a carbon precursor of the above carbonaceous substance, are mixed in the liquid phase with the dispersion medium. Then, the mixture is calcined after the dehydration and the solidification. As a result, the negative electrode active material is manufactured. The above carbonaceous substance may be further mixed.

Particles including at least silicon are used as the negative electrode active material substance. Specific examples of the negative electrode active material substance preferably include $SiO_x$ ($0.8 \leq X \leq 1.5$) minute particles, and minute particles manufactured by rapidly heating and rapidly cooling mixed power of silicon and silicon oxide as a raw material. The average primary grain diameter of these types of particles is preferably 10 nm or more to 1000 nm or less. In a case where Sn, Al, or Ti is used for the M or in a case where the M includes Sn, Al, or Ti, for example, a complex including at least metal minute particles of Sn, Al, or Ti covered with an oxide of the M, can be used.

Examples of the compound including at least an Si atom and an O atom can include an alkoxide (alkoxide compound), such as tetraethyl orthosilicate. In a case where Sn, Al, or Ti is used for the M or in a case where the M includes Sn, Al, or Ti, examples of a compound including at least an Sn atom, an Al atom, or a Ti atom, and an O atom include compounds (alkoxide compound) such as tetra-i-propoxytin, tri-i-propoxyaluminum, and tetra-i-propxytitanium, for each of the cases.

Examples of the carbon precursor include an organic compound, such as a monomer that is liquid and is easily polymerizable, or an oligomer. For example, furan resin, xylene resin, ketone resin, amino resin, melamine resin, urea resin, aniline resin, urethane resin, polyimide resin, polyester resin, phenolic resin, and monomers thereof are included. Specific examples of the monomers include furan compounds, such as furfuryl alcohol, furfural, and a furfural derivative. The monomers are polymerized in a mixture of composite materials so as to be used. A method for the polymerization depends on the carbon precursor, and includes, for example, addition of hydrochloric acid and acid anhydride, or heating. Solid powder, such as sucrose, ascorbic acid, and citric acid, can be used for the carbon precursor. In a case where the negative electrode active material including the covering material including no carbonaceous substance is manufactured, the carbonaceous substance and the carbon precursor are not required.

Examples of the dispersion medium can include water, ethanol, isopropyl alcohol, acetone, N-methylpyrrolidone, a fatty acid, such as oleic acid or linoleic acid. The dispersion medium is preferably a liquid that does not react on the material to be mixed with the dispersion medium. A mixing method with the dispersion medium may be a solid kneading method in which an amount of a liquid phase is less than that of a solid phase, or a mixing and stirring method in which the amount of the liquid phase is more than that of the solid phase. The mixing and stirring method can be performed by various types of stirrers, a ball mill apparatus, a bead mill apparatus, or a combination thereof. The mixing may be performed with heating during a section of the mixing process. The hot mixing can further increase binding capacity between the Si—O—C mixed body and the silicon-containing particles that have been formed. Examples of the above hot mixing include a method of stirring the mixture contained in a well-closed container with a stirring bar, with heating at a temperature of 50° C. or more to 100° C. or less.

The mixture after the performance of the mixing is subjected to the dehydration and the solidification. The dehydration can be performed by standing in the atmosphere or heating. The solidification may be performed by the above polymerization. Alternatively, the solidification may be performed simultaneously with the dehydration. These methods are appropriately selected based on the type of the carbon precursor.

A solid body after the performance of the dehydration and the solidification, is subjected to the calcination. During the calcination, heating is performed under an inert atmosphere, such as Ar, and formation of the Si—O—C mixed body is performed. The preferred temperature of the calcination is in a range of 600° C. or more to 1500° C. or less, more preferably, in a range of 800° C. or more to 1300° C. or less. As the temperature decreases, the formation of the Si—O—C mixed body becomes insufficient. As the temperature increases, a possibility that a silicon phase in the silicon-containing particles causes grain growth, increases. Calcination time is preferably between an hour and twelve hours.

Note that carbon covering may be performed to the particles obtained by complexing treatment. Examples of the material to be used for covering, that can be used, include pitch, a resin, and a polymer that become the carbonaceous substance by heating under an inert atmosphere. Specifically, oil pitch, mesophase pitch, furan resin, cellulose, rubber, and the like that are sufficiently carbonized by the calcination at approximately 1200° C., are preferable. In the covering method, the monomer is polymerized in a state where the complex particles have been dispersed in the monomer. Then, the solidified monomer is given to the carbonizing calcination. Alternatively, the polymer is dissolved into a solvent and the complex particles are dispersed therein. Then, the solvent is transpired. After that, an obtained solid body is given to the carbonizing calcination. As another method to be used for the carbon covering, carbon covering can be performed by CVD. This method is a method of flowing a gaseous carbon source with inert gas as carrier gas onto a target object heated between 800° C. or more to 1000° C. or less, and performing carbonization on a surface of the target object. In this case, examples of the carbon source that can be used include benzene, toluene, and styrene. Upon the performance of the carbon covering by the CVD, the target object is heated between 800° C. or more to 1000° C. or less. Thus, the carbon covering may be performed simultaneously with the carbonizing calcination.

Upon the carbon covering, a lithium compound and an $SiO_2$ source may be simultaneously added.

The negative electrode active material includes particles that perform insertion and separation of Li. The average primary grain diameter is preferably 1 μm or more to 80 μm or less, more preferably, 10 μm or more to 60 μm or less. The grain diameter of the active material influences the speed of an insertion and separation action of lithium, and has large influence with respect to negative electrode characteristics. However, when the grain diameter satisfies the above ranges, the characteristics can be stably provided. Note that, the negative electrode active material is observed with a SEM. Then, for the average primary grain diameter of the active material, an average of sizes in 10 directions selected at random is calculated with respect to 10 or more regions in the active material selected at random from an obtained image.

The active material preferably includes zirconia or stabilized zirconia in order to prevent retention of a structure of the active material particles and aggregation of the silicon-retaining particles. Preventing the aggregation of the silicon-retaining particles has an advantage of improving the cycle characteristics.

The nonaqueous electrolyte secondary battery according to the embodiment will be described. The nonaqueous electrolyte secondary battery includes an exterior material, a positive electrode, a negative electrode, and a nonaqueous electrolyte. The positive electrode is housed in the exterior material. The negative electrode is spatially apart from the positive electrode, and is housed with, for example, a separator interposed between the positive electrode and the negative electrode in the exterior material. The negative electrode includes the active material. The nonaqueous electrolyte is filled in the exterior material.

Second Embodiment

An electrode for a nonaqueous electrolyte battery according to a second embodiment, includes a collector and a negative electrode mixture layer on the collector. The negative electrode mixture layer includes an active material and a binder. The active material includes a carbonaceous substance and a complex including metal in the carbonaceous substance. The electrode according to the embodiment will be described below with an example of a negative electrode. The electrode according to the embodiment may be used for a positive electrode. In the descriptions below, the embodiment will be described with an example of a nonaqueous electrolyte secondary battery. The electrode according to the embodiment can be used for various types of batteries.

Figure 3:
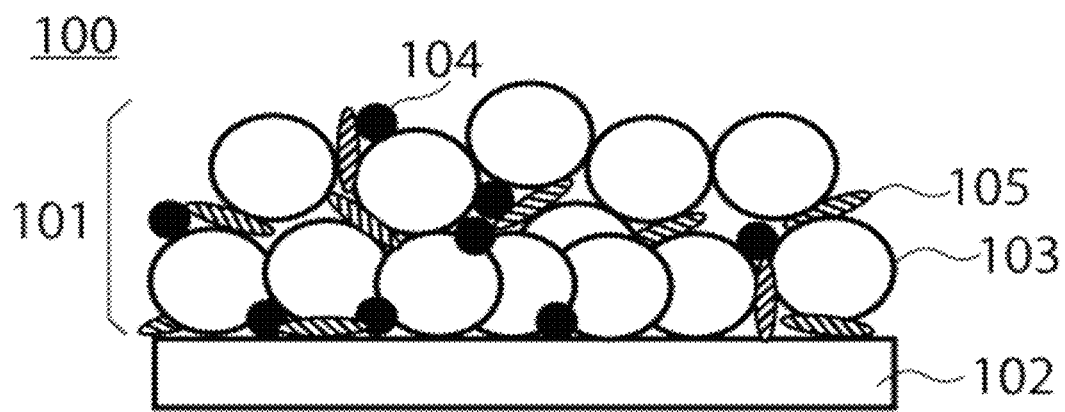
FIG. 3 is a conceptual view of an electrode according to a second embodiment.

As illustrated in a conceptual view of FIG. 3, the negative electrode 100 according to the second embodiment includes the negative electrode mixture layer 101 and the collector 102. The negative electrode mixture layer 101 is a mixture layer disposed on the collector 102 and that includes the active material. The negative electrode mixture layer 101 includes a negative electrode active material 103, a conductive material 104, and the binder 105. The binder 105 causes the negative electrode mixture layer 101 and the collector 102 to adhere to each other.

The thickness of the negative electrode mixture layer 101 is preferably in a range of 1.0 μm or more to 150 μm or less. Therefore, the total thickness of the negative electrode mixture layer 101 is in a range of 2.0 μm or more to 300 μm or less in a case where the negative electrode mixture layer 101 is provided on both sides of the negative electrode collector 102. A more preferable range of the thickness of the negative electrode mixture layer 101 on the one side is 30 μm or more to 100 μm or less. Large-current discharge characteristics and cycle characteristics sharply improve in this range.

The compounding ratios of the negative electrode active material 103, the conductive material 104, and the binder 105 in the negative electrode mixture layer 101, are preferably 57 mass % or more to 95 mass % or less, 3 mass % or more to and 20 mass % or less, and 2 mass % or more to 40 mass % or less, respectively, in order to achieve the excellent large-current discharge characteristics and cycle characteristics.

The collector 102 according to the embodiment is a conductive member that binds with the negative electrode mixture layer 101. A conductive substrate having a porous structure or a nonporous and conductive substrate can be used for the collector 102. These conductive substrates can be formed of, for example, copper, stainless steel, or nickel. The thickness of the collector 102 is preferably 5 μm or more to 20 μm or less. A balance between electrode strength and weight reduction can be made in this range.

The negative electrode active material 103 according to the embodiment, preferably includes the carbonaceous substance and the complex including at least the metal in the carbonaceous substance, in terms of the cycle characteristics and capacity characteristics. The carbonaceous substance in the negative electrode active material 103 preferably includes at least a complex including metal and metal oxide or a complex including metal, metal oxide, and a carbide of the metal. The metal may be an alloy. The average primary grain diameter of the negative electrode active material 103 is, for example, 0.5 μm or more to 50 μm or less.

The metal and/or the metal oxide preferably includes at least one type selected from an element selected from the group consisting of; Si, Sn, Al, In, Ga, Pb, Ti, Ni, Mg, W, Mo, and Fe, an alloy including the selected element, a metal oxide of the selected element, and an oxide including the selected element. The high-capacity negative electrode active material 103 is obtained with these types of metal and oxide. For simplification of the descriptions, the metal and the metal oxide are assumed to be silicon and silicon oxide, respectively. Then, the descriptions will be given. The alloy may include metal except the selected element.

Specific examples of the negative electrode active material 103 include a form including a silicon oxide phase in the carbonaceous substance and a silicon phase in the silicon oxide phase, and a form including the complex having silicon particles covered with silicon oxide and silicon carbide in the carbonaceous substance.

The carbonaceous substance of the negative electrode active material 103 is conductive, and forms the active material. Examples of the carbonaceous substance that can be used include at least one material selected from the group consisting of; graphite, hard carbon, soft carbon, amorphous carbon, and acetylene black. The carbonaceous substance can be formed of one type or several types. The carbonaceous substance has preferably high strength in terms of acquisition of the electrode having the excellent cycle characteristics. As the high-strength carbonaceous substance, hard carbon is preferably included.

The carbonaceous substance may include carbon fiber in order to prevent retention of a structure and aggregation of silicon and silicon oxide, and in order to improve the conductivity. The average diameter of the carbon fiber is preferably 10 nm or more to 1000 nm or less. A carbon fiber content of 5 mass % or less is preferably included in the negative electrode active material 103 because the large carbon fiber content reduces battery capacity.

Next, a method of manufacturing the negative electrode will be described. First, the negative electrode active material 103, the conductive material 104, and the binder 105 are suspended in a general-purpose solvent so that slurry is prepared. The slurry is coated on the collector 102, and then is dehydrated. After that, a press is performed so that the negative electrode 100 is manufactured. Pressure of the press can adjust embedding of the negative electrode active material 103 into the collector 102. The press with a pressure lower than 0.2 kN/cm is not preferable because the embedding barely occurs. When the press with a pressure higher than 10 kN/cm is performed, damage, such as cracks of the negative electrode active material 103 and the collector 102, occurs. Thus, the high pressure is not preferable. Therefore, the pressure of the press to a layer including the slurry dehydrated, is preferably 0.5 kN/cm or more to 5 kN/cm or less.

The nonaqueous electrolyte secondary battery according to the second embodiment will be described.

The nonaqueous electrolyte secondary battery according to the second embodiment includes an exterior material, the positive electrode, the negative electrode, and a nonaqueous electrolyte. The positive electrode is housed in the exterior material. The negative electrode is spatially apart from the positive electrode, and is housed with, for example, a separator interposed between the positive electrode and the negative electrode in the exterior material. The negative electrode includes the active material. The nonaqueous electrolyte is filled in the exterior material.

Figure 4:
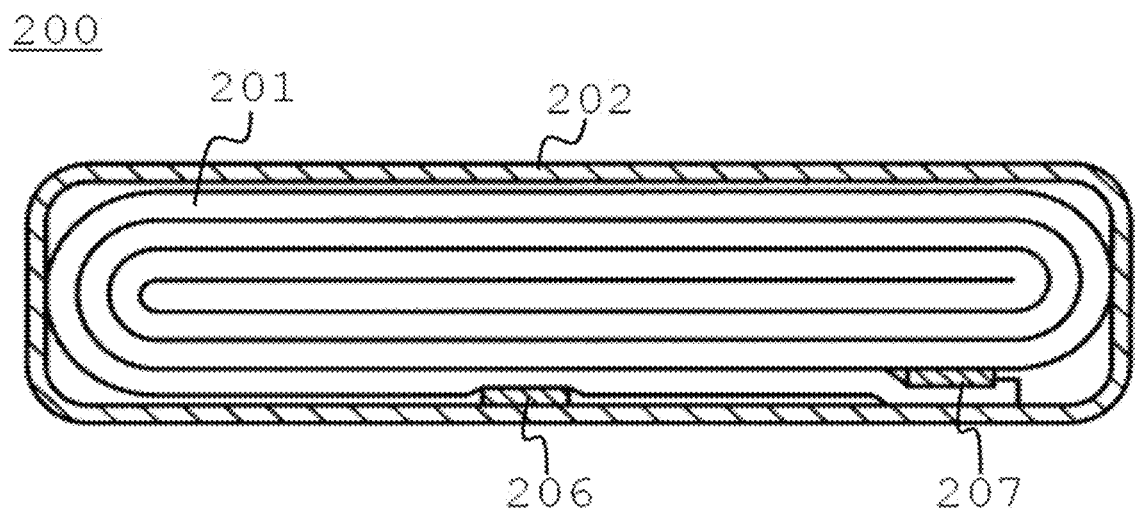
FIG. 4 is a conceptual view of a nonaqueous electrolyte secondary battery according to the second embodiment.

The more detailed descriptions will be given with reference to a conceptual view of an exemplary nonaqueous electrolyte secondary battery 200 according to the embodiment in FIG. 4. FIG. 4 is a conceptual sectional view of the flat nonaqueous electrolyte secondary battery 200 having the saclike exterior material 202 including a laminated film.

Figure 5:
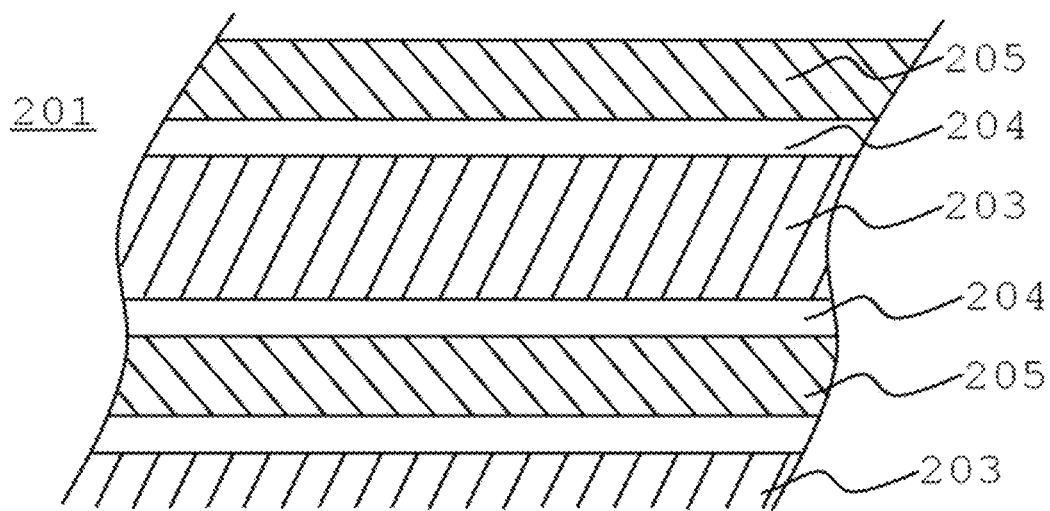
FIG. 5 is an enlarged conceptual view of the nonaqueous electrolyte secondary battery according to the second embodiment.

A flat wound electrode group 201 is housed in the saclike exterior material 202 including the laminated film having aluminum foil interposed between two resin layers. As illustrated in a partially extracted conceptual view in FIG. 5, the flat wound electrode group 201 includes the negative electrode 203, the separator 204, the positive electrode 205, and the separator 204, disposed in sequence. The disposed materials are spirally wound and the spiral disposed materials are subjected to press forming. As a result, the flat wound electrode group 201 is formed. An electrode nearest to the saclike exterior material 202 is the negative electrode. The negative electrode includes no negative electrode mixture formed on the negative electrode collector on the side of the saclike exterior material 202. The negative electrode has a configuration in which the negative electrode mixture is formed only on one side of the negative electrode collector on the side of a battery inner surface. Other negative electrodes 203 include the negative electrode mixture formed on both sides of the negative electrode collector. The positive electrode 205 includes a positive electrode mixture layer formed on both sides of a positive electrode collector.

In proximity to an outer circumferential end of the wound electrode group 201, a negative electrode terminal 206 is electrically coupled to the negative electrode collector of the outermost negative electrode 203 and a positive electrode terminal 207 is electrically coupled to the positive electrode collector of the positive electrode 205 inside. These negative electrode terminal 206 and positive electrode terminal 207 protrude from an opening of the saclike exterior material 202 to the outside. For example, the liquid nonaqueous electrolyte is injected from the opening of the saclike exterior material 202. Heat sealing is performed to the opening of the saclike exterior material 202 with the negative electrode terminal 206 and the positive electrode terminal 207 interposed. Thus, the wound electrode group 201 and the liquid nonaqueous electrolyte are sealed.

Examples of the negative electrode terminal 206 include aluminum and an aluminum alloy including, for example, an element of Mg, Ti, Zn, Mn, Fe, Cu, or Si. The negative electrode terminal 206 is preferably a material the same as that of the negative electrode collector in order to reduce contact resistance with the negative electrode collector.

A material having electrical stability and conductivity in a range in which potential with respect to lithium ion metal is between 3 and 4.25 V, can be used for the positive electrode terminal 207. The specific examples include aluminum and an aluminum alloy including, for example, an element of Mg, Ti, Zn, Mn, Fe, Cu, or Si. The positive electrode terminal 207 is preferably a material the same as that of the positive electrode collector in order to reduce contact resistance with the positive electrode collector.

The saclike exterior material 202, the positive electrode 205, the electrolyte, and the separator 204 that are constituent members of the nonaqueous electrolyte secondary battery 200, will be described in detail below.

1) Saclike Exterior Material 202

The saclike exterior material 202 is formed of the laminated film with a thickness of 0.5 mm or less. Alternatively, a metal-made container with a thickness of 1.0 mm or less is used for the exterior material 202. The thickness of the metal-made container is more preferably 0.5 mm or less.

The shape of the saclike exterior material 202 can be selected from a flat type (thin type), a rectangular type, a cylindrical type, a coin type, or a button type. Examples of the exterior material include an exterior material for a small-sized battery to be set in portable electronic devices, and an exterior material for a large-sized battery to be set in two-wheeled or four-wheeled vehicles, in response to battery size.

A multilayer film including a metal layer interposed between resin layers, is used for the laminated film. The metal layer is preferably aluminum foil or aluminum alloy foil for weight reduction. Examples of the resin layers that can be used include high polymer materials, such as polypropylene (PP), polyethylene (PE), nylon, and polyethylene terephthalate (PET) Sealing is performed to the laminated film by heat sealing. Thus, the laminated film can be formed so as to have the shape of the exterior material.

The metal-made container is formed of, for example, aluminum or an aluminum alloy. The aluminum alloy is preferably an alloy including, for example, an element of magnesium, zinc, or silicon. In a case where the alloy includes a transition metal, such as copper, nickel, or chromium, the amount of the transition metal is preferably 100 mass ppm or less.

2) Positive Electrode 205

The positive electrode 205 has a structure in which the positive electrode mixture layer is supported on one side or both sides of the positive electrode collector, the positive electrode mixture layer including the active material.

The thickness of the positive electrode mixture layer on the one side is preferable in a range of 1.0 μm or more to 150 μm or less in terms of improvement of the large-current discharge characteristics and the cycle characteristics. Therefore, in a case where being supported on both sides of the positive electrode collector, the total thickness of the positive electrode mixture layer is preferably in a range of μm or more to 300 μm or less. The more preferable range of the thickness on the one side is between 30 μm or more to 120 μm or less. The large-current discharge characteristics and the cycle characteristics improve in the range.

The positive electrode mixture layer may include a conductive material other than a binder that binds a positive electrode active material and another positive electrode active material.

Various types of oxides, such as manganese dioxide, lithium-manganese compound oxide, lithium-containing nickel-cobalt oxide (for example, $LiCoO_2$, $LiNi_{0.8}Co_{0.2}O_2$), and lithium-manganese compound oxide (for example, $LiMn_2O_4$, $LiMnO_2$) are preferably used for the positive electrode active material in order to achieve a high voltage.

Examples of the conductive material include acetylene black, carbon black, and graphite.

Specific examples of the binder that can be used include polytetrafluoroethylene (PTFE), polyvinylidene fluoride (PVdF), ethylene-propylene-diene copolymer (EPDM), and styrene-butadiene rubber (SBR).

The compounding ratios of the positive electrode active material, the conductive material, and the binder, are preferably in a range of 80 mass % or more to 95 mass % or less, in a range of 3 mass % or more to 20 mass % or less, and in a range of 2 mass % or more to 7 mass % or less, respectively, in order to achieve the excellent large-current discharge characteristics and cycle characteristics.

A conductive substrate having a porous structure or a nonporous and conductive substrate can be used for the collector. The thickness of the collector is preferably between 5 μm or more to 20 μm or less. A balance between electrode strength and weight reduction can be made in this range.

For example, the active material, the conductive material, and the binder are suspended in a general-purpose solvent so that slurry is prepared. Then, the slurry is coated on the collector, and then is dehydrated. After that, a press is performed so that the positive electrode 205 is manufactured. The active material, the conductive material, and the binder are formed so as to be pellet-shaped as a positive electrode layer. The positive electrode 205 may be manufactured by forming the positive electrode layer on the collector.

3) Negative Electrode 203

The electrode according to the second embodiment can be used for the negative electrode 203.

4) Electrolyte

Examples of the electrolyte that can be used include a nonaqueous electrolytic solution, an electrolyte impregnation-typed polymer electrolyte, a high polymer electrolyte, and an inorganic solid electrolyte.

The nonaqueous electrolytic solution is a liquid electrolytic solution prepared by dissolving the electrolyte into a nonaqueous solvent. The nonaqueous electrolytic solution is retained in a space in the electrode group.

A nonaqueous solvent having, as a main body, a mixed solvent including propylene carbonate (PC), or ethylene carbonate (EC), and a nonaqueous solvent with viscosity lower than that of each of the PC and the EC (hereinafter, referred to as a second solvent), is preferably used for the nonaqueous solvent.

For example, chain carbon is preferable for the second solvent. Specific examples of the second solvent include dimethyl carbonate (DMC), methyl ethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). These second solvents can be individually used or can be used in a form of a mixture including at least two types. In particular, the second solvent preferably has a donner number of 16.5 or less.

The viscosity of the second solvent is preferable 2.8 cPs or less at 25° C. A compounding amount of ethylene carbonate or propylene carbonate in the mixed solvent is preferably between 1.0% or more to 80% or less in volume ratio. A more preferable compounding amount of ethylene carbonate or propylene carbonate is between 20% or more to 75% or less in volume ratio.

Examples of the electrolyte included in the nonaqueous electrolytic solution, include lithium salt (electrolyte), such as lithium perchlorate ($LiClO_4$), lithium phosphate hexafluoride (LiPF$_6$), lithium borofluoride (LiBF$_4$), lithium arsenic hexafluoride (LiAsF$_6$), lithium trifluoromethanesulfonate (LiCF$_3$SO$_3$), and bistrifluoromethyl sulfonylimide lithium [LiN(CF$_3$SO$_2$)$_2$]. In particular, LiPF$_6$ or LiBF$_4$ is preferably used.

An amount of dissolution of the electrolyte with respect to the nonaqueous solvent is preferably made to be between 0.5 mol/L or more to 2.0 mol/L or less.

5) Separator 204

In a case where the nonaqueous electrolytic solution is used and in a case where the electrolyte impregnation-typed polymer electrolyte is used, the separator 204 can be used. A porous separator is used for the separator 204. Examples of a material of the separator 204 that can be used include a porous film and a synthetic-resin-made nonwoven fabric that include polyethylene, polypropylene, or polyvinylidene fluoride (PVdF). In particular, the porous film including polyethylene, polypropylene, or both thereof, is preferable because safety of the secondary battery can improve.

The thickness of the separator 204 is preferably made to be 30 µm or less. When the thickness exceeds 30 µm, a distance between the positive electrode and the negative electrode increases. Thus, there is a risk that internal resistance increases. The lower limit of the thickness is preferably made to be 5 µm. When the thickness is made to be less than 5 µm, strength of the separator 204 considerably degrades. Thus, there is a risk that an internal short circuit easily occurs. The upper limit of the thickness is more preferably made to be 25 µm. The lower limit is more preferably made to be 1.0 µm.

The separator 204 preferably has a thermal shrinkage factor of 20% or less when having been let stand at 120° C. for an hour. When the thermal shrinkage factor exceeds 20%, a possibility that a short circuit occurs due to heating, increases. The thermal shrinkage factor is preferably made to be 15% or less.

The porosity of the separator 204 is preferably in a range of 30% or more to 70% or less. This is because of the following reason. When the porosity is made to be less than 30%, there is a risk that the separator 204 has difficulty in acquiring high electrolyte retentivity. Meanwhile, when the porosity exceeds 70%, there is a risk that the sufficient strength of the separator 204 is not obtained. A more preferable range of the porosity is between 35% or more to 70% or less.

The separator 204 preferably has an air transmissivity of 500 sec/100 cm$^3$ or less. When the air transmissivity exceeds 500 sec/100 cm$^3$, there is a risk that the separator 204 has difficulty in acquiring high lithium ion mobility. The lower limit of the air transmissivity is 30 sec/100 cm$^3$. This is because there is a risk that the sufficient strength of the separator 204 is not obtained when the air transmissivity is made to be less than 30 sec/100 cm$^3$.

The upper limit of the air transmissivity is more preferably made to be 300 sec/100 cm$^3$. The lower limit of the air transmissivity is more preferably made to be 50 sec/100 cm$^3$.

Third Embodiment

Next, a battery pack according to a third embodiment will be described.

The battery pack according to the third embodiment includes at least one nonaqueous electrolyte secondary battery according to the second embodiment described above (namely, electric cell). In a case where the battery pack includes a plurality of electric cells, the respective electric cells are electrically coupled in series, in parallel, or in series and in parallel so as to be disposed.

The battery pack 300 will be specifically described with reference to a conceptual view in FIG. 6 and a block diagram in FIG. 7. The battery pack 300 illustrated in FIG. 6 uses the flat nonaqueous electrolyte secondary battery 200 illustrated in FIG. 4 as the electric cell 301.

A plurality of electric cells 301 is disposed so that negative electrode terminals 302 and positive electrode terminals 303 protruding to the outside are arranged in the same direction. The plurality of electric cells 301 is fastened with an adhesive tape 304 so that an assembled battery 305 is formed. These electric cells 301 are electrically coupled to each other in series as illustrated in FIG. 7.

A printed circuit board 306 is disposed so as to face a side surface of the electric cells 301 from which the negative electrode terminals 302 and the positive electrode terminals 303 protrude. The printed circuit board 306 includes a thermistor 307, a protective circuit 308, and a current-carrying terminal 309 to an external device, mounted thereon as illustrated in FIG. 7. Note that, a surface of the printed circuit board 306 facing the assembled battery 305, includes an insulating plate (not illustrated) attached thereon in order to avoid unnecessary connection with a conductive line of the assembled battery 305.

A positive-electrode-side lead 310 is coupled to the positive electrode terminal 303 positioned at the lowest layer of the assembled battery 305. A leading end of the positive electrode terminal 303 is inserted into a positive-electrode-side connector 311 of the printed circuit board 306 so as to be electrically coupled. A negative-electrode-side lead 312 is coupled to the negative electrode terminal 302 positioned at the highest layer of the assembled battery 305. A leading end of the negative electrode terminal 302 is inserted into a negative-electrode-side connector 313 of the printed circuit board 306 so as to be electrically coupled. These connectors 311 and 313 are coupled to the protective circuit 308 through wirings 314 and 315 formed on the printed circuit board 306.

The thermistor 307 is used in order to detect the temperature of the assembled battery 305. A detected signal is transmitted to the protective circuit 308. The protective circuit 308 can disconnect a plus-side wrings 316a and a minus-side wirings 316b between the protective circuit 308 and the current-carrying terminal 309 to the external device in predetermined conditions. The predetermined conditions include, for example, a case where the temperature detected by the thermistor 307 becomes a predetermined temperature or more.

The predetermined conditions also include a case where, for example, an overcharge, an overdischarge, or an excess current of the electric cells 301 is detected. The detection of the overcharge or the like is performed to each of the electric cells 301 or the entire electric cells 301. In a case where each of the electric cells 301 is detected, a battery voltage may be detected. Alternatively, positive electrode potential or negative electrode potential may be detected. In the latter case, a lithium electrode to be used as a reference electrode is inserted into each of the electric cells 301. In cases of FIGS. 6 and 7, conductive lines 317 for the voltage detection are coupled to the respective electric cells 301. A detection signal is transmitted to the protective circuit 308 through each of the conductive lines 317.

Protective sheets 318 including rubber or resin are individually disposed on three lateral surfaces of the assembled battery 305 except the side surface from which the positive electrode terminals 303 and the negative electrode terminals 302 protrude.

The assembled battery 305 is housed in a housing container 319 together with the respective protective sheets 318 and the printed circuit board 306. That is, the respective protective sheets 318 are individually disposed on both inner side surfaces of the housing container 319 in a longitudinal direction and on an inner side surface of the housing container 319 in a lateral direction. The printed circuit board 306 is disposed on another inner side surface on the side opposite to the inner side surface in the lateral direction. The assembled battery 305 is positioned in a space surrounded by the protective sheets 318 and the printed circuit board 306. A lid 320 is attached to an upper surface of the housing container 319.

Note that, a heat-shrinkable tape may be used for fixing the assembled battery 305, instead of the adhesive tape 304. In this case, the protective sheets 318 are disposed on both of the inner side surfaces of the assembled battery 305 and then the heat-shrinkable tape is wound therearound. After that, the heat-shrinkable tape is subjected to thermal contraction so that the assembled battery 305 is bound.

Figure 6:
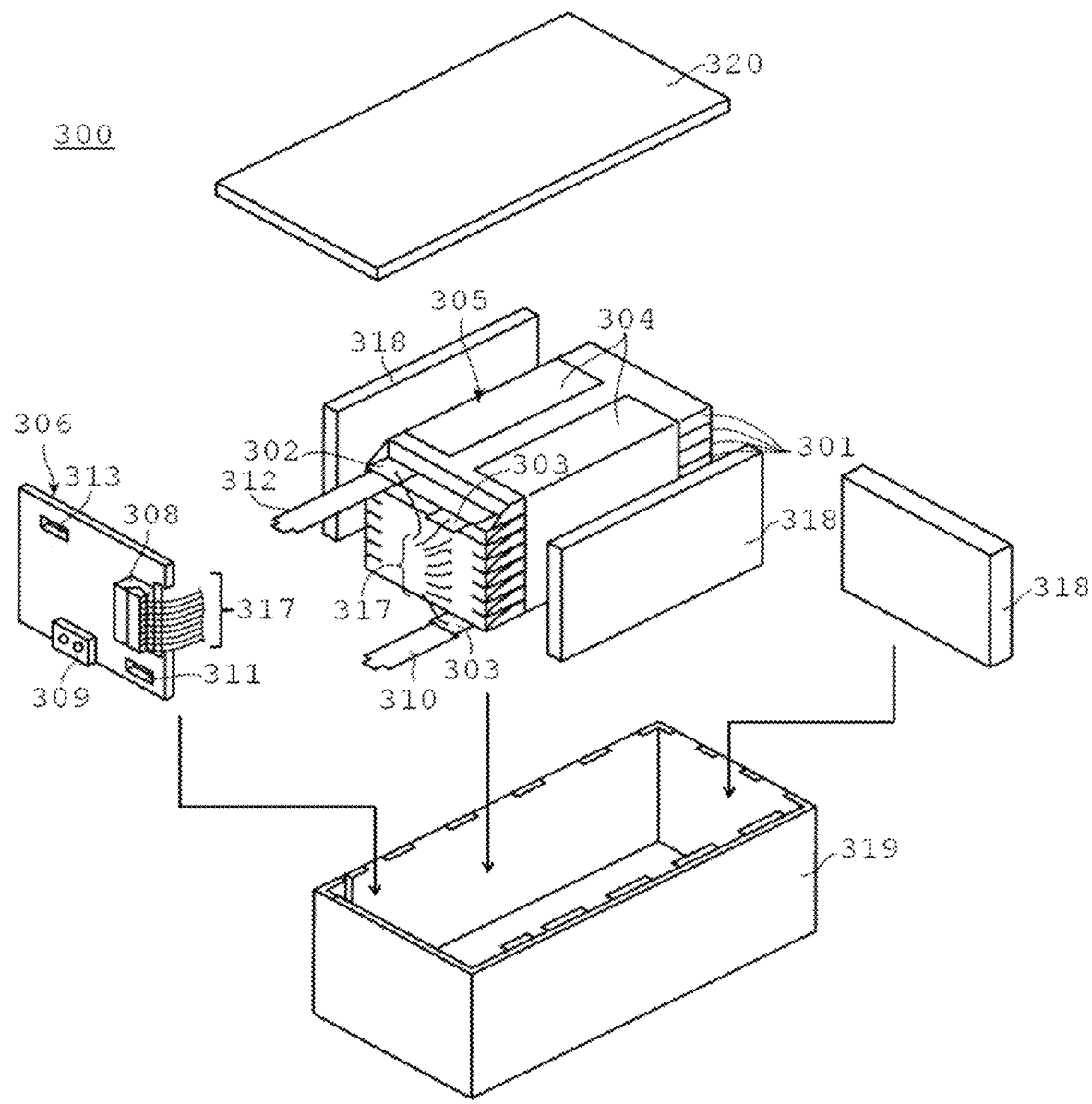
FIG. 6 is a schematic view of a battery pack according to a third embodiment.
Figure 7:
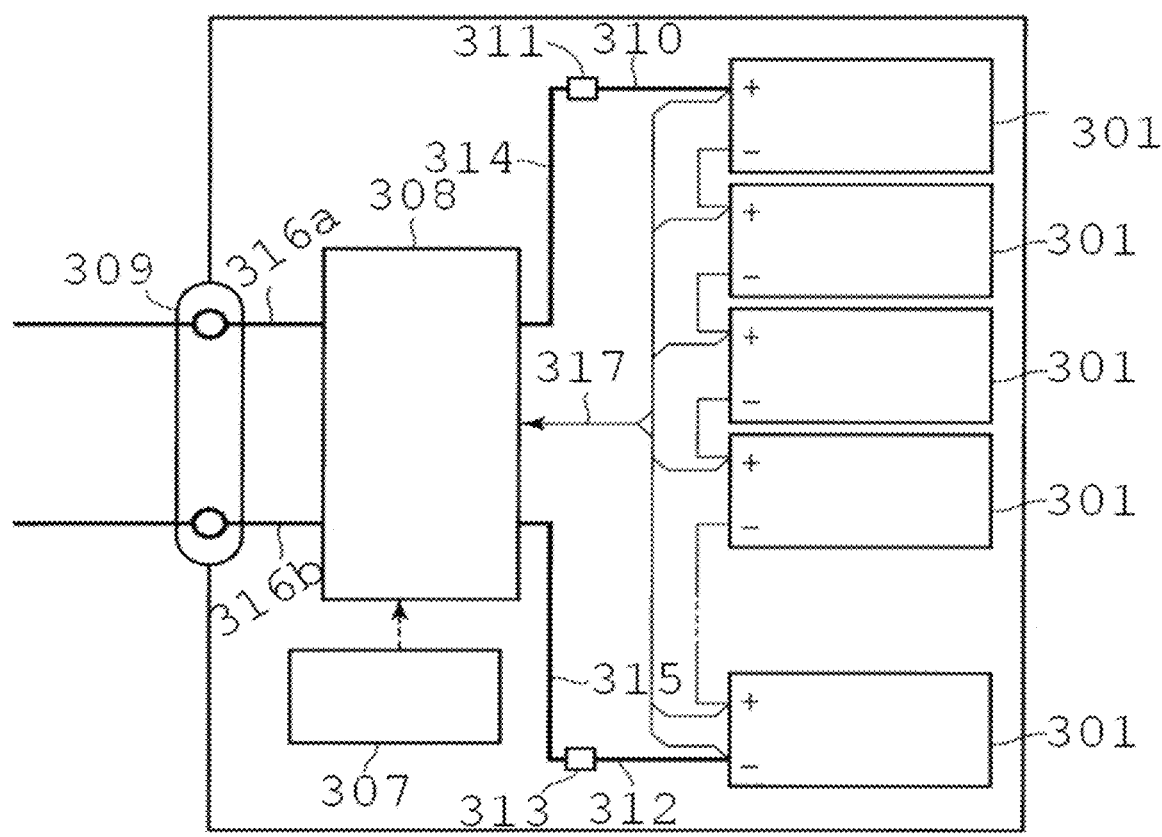
FIG. 7 is a block diagram of an electric circuit of the battery pack.

A form in which the electric cells 301 are coupled in series, has been given in FIGS. 6 and 7. The electric cells 301 may be coupled in parallel in order to increase battery capacity. Alternatively, a combination of serial connection and parallel connection may be used. The assembled battery packs can be further coupled in series or in parallel.

According to the present embodiment described above, the battery pack having an excellent charge and discharge cycle function can be provided by including the nonaqueous electrolyte secondary battery having the excellent charge and discharge cycle function according to the second embodiment.

Note that, a form of the battery pack is appropriately varied depending on a use. The use of the battery pack is preferable in a case where excellent cycle characteristics are given when large current is extracted. Specifically, examples of the use of the battery pack include a power supply of a digital camera and vehicles, such as a two-wheeled or four-wheeled hybrid electric vehicle, a two-wheeled or four-wheeled electric vehicle, and an electric assisted bicycle. In particular, the battery pack with the nonaqueous electrolyte secondary battery having excellent high-temperature characteristics, is preferably used for the vehicles.

Forth Embodiment

Figure 8:
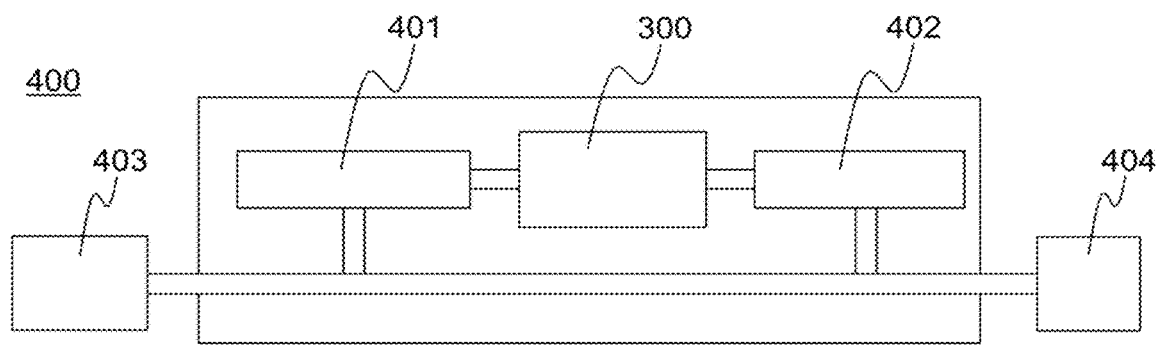
FIG. 8 is a schematic view of a power storage device according to a forth embodiment.

A power storage device 400 can be equipped with the battery pack 300 according to the third embodiment. The power storage device 400 illustrated in a schematic view of FIG. 8 includes the battery pack 300, an inverter 402, and a converter 401. The converter 401 performs DC conversion to an external AC power supply 403 so that the battery pack 300 is charged. Then, the inverter 402 having a DC power supply from the battery pack 300, performs AC conversion so that electricity is supplied to a load 404. The power storage device 400 includes the present configuration with the battery pack 300 according to the forth embodiment. Thus, the power storage device 400 having excellent battery characteristics is provided.

Fifth Embodiment

Figure 9:
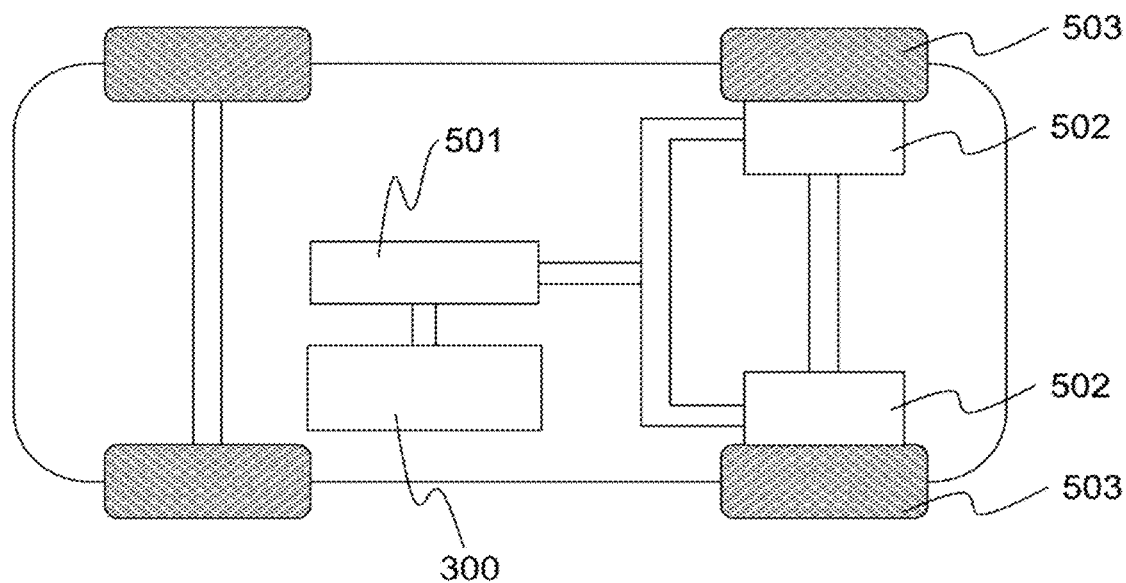
FIG. 9 is a schematic view of a vehicle according to a fifth embodiment.
Figure 10:
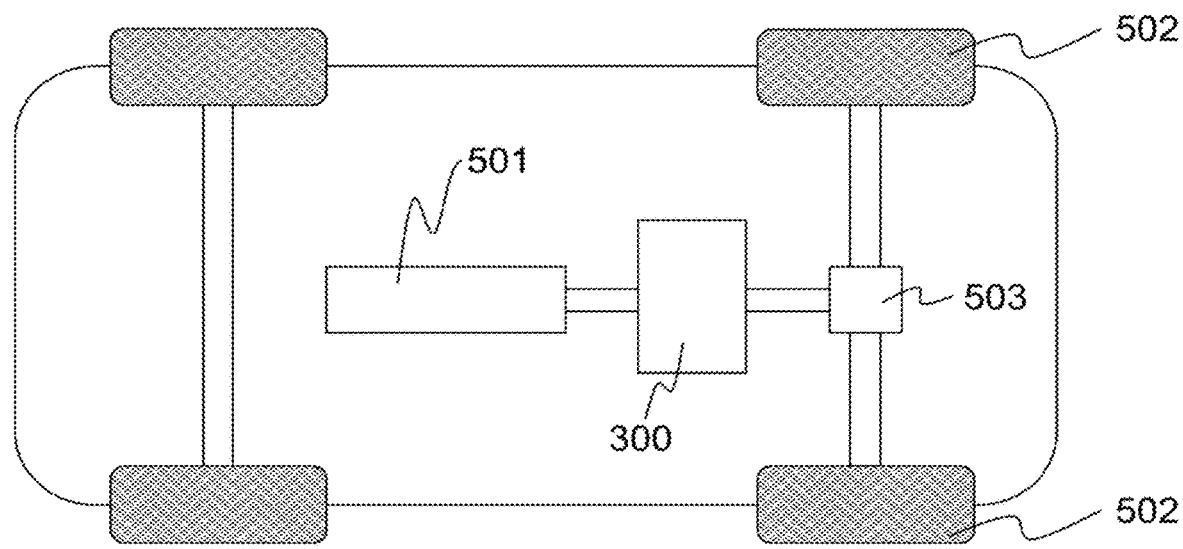
FIG. 10 is a schematic view of another vehicle according to the fifth embodiment.

A vehicle 500 can be equipped with the battery pack 300 according to the third embodiment. The vehicle 500 illustrated in a schematic view of FIG. 9 includes at least the battery pack 300, an inverter 501, a motor 502, and wheels 503. The inverter 501 performs AC conversion to a DC power supply from the battery pack 300. Then, the AC power supply drives the motor 502. In a case where a motor driven by direct current is used, the inverter 501 is omitted. In the figure, for example, a charging mechanism of a battery pack 300 is omitted. Driving force of the motor 502 can rotate the wheels 503. Note that, examples of the vehicle 500 include an electric motor vehicle, such as an electric train, and a hybrid vehicle having another driving source, such as an engine. The battery pack 300 may be charged by regenerative energy from the motor 502. Driving by electrical energy from the battery pack 300 is not limited to the motor 502. As illustrated in a schematic view of FIG. 10, the driving may be used for a power source for operating an electrical device 501 of a vehicle 500. In a case of the vehicle 500 illustrated in the schematic view of FIG. 10, for example, a dynamo 503, such as a motor, fitted to an axle portion of a pair of wheels 502, operates upon deceleration of the vehicle 500 so that regenerative energy is obtained. Then, the battery pack 300 is preferably charged by using the obtained regenerative energy.

Specific examples will be given and effects thereof will be described below.

Example 1

A negative electrode active material according to Example 1 was obtained in the following conditions. Silicon monoxide powder (−325 mesh) manufactured by Sigma-Aldrich Co. was made to be powder having an average primary grain diameter of approximately 150 nm by wet grinding. The powder was used as silicon oxide. A planetary-typed ball mill apparatus performed mixing after tetraethyl orthosilicate in an amount of 2 g, furfuryl alcohol in an amount of 5 g, graphite in an amount of 0.3 g, and ethanol in an amount of 12 g were added to silicon oxide powder obtained as described above in an amount of 4 g, together with YSZ balls (0.2 mm). Addition of liquid mixed in an amount of 0.4 g with the ratios of hydrochloric acid, water, and ethanol that are 2, 2, and 1, respectively, by mass ratio, to liquid separated from the YSZ balls by a suction filtration method, was performed. Then, the mixed liquid was left at room temperature for one week so as to be dehydrated and solidified. The obtained solidified material was retained and calcined at 1100° C. for three hours under an atmosphere of Ar. The calcined material was pulverized with an agate-made mortar. A negative electrode active material of −45 μm was obtained by sieving.

(Charge and Discharge Test)

Graphite with an average diameter of 3 μm in an amount of 15% by mass and polyimide in an amount of 8% by mass were kneaded together with N-methylpyrrolidone as dispersion media in the obtained negative electrode active material. The kneaded material was coated on copper foil with a thickness of 12 μm and then was rolled. After that, the rolled material was subjected to heat treatment in Ar gas at 250° C. for two hours, and was cut into a predetermined size. After that, the cut material was dehydrated in a vacuum at 100° C. for twelve hours. As a result, a test electrode was made. A battery including a counter electrode and a reference electrode having a metal of Li and an electrolytic solution having an EC·DEC (volume ratio: EC:DEC=1:2) solution of $LiPF_6$ (1M), was manufactured in an atmosphere of argon. Then, a charge and discharge test was performed with the battery. In conditions of the charge and discharge test, the charge was performed with a current density of 1 mA/cm² until a potential difference of 0.01 V between the reference electrode and the test electrode. Furthermore, the constantvoltage charge was performed at 0.01 V for 24 hours. The discharge was performed with a current density of 1 mA/cm$^2$ until 1.5V. Furthermore, cycles in which the charge was performed with a current density of 1 mA/cm$^2$ until a potential difference of 0.01 V between the reference electrode and the test electrode and then the discharge was performed with a current density of 1 mA/cm$^2$ until 1.5 V, were performed. Then, a transition of discharge capacity was measured. Based on the transition, a cycle number with which the discharge capacity can retain 80% of an initial discharge capacity, was defined as the 80% capacity retention cycle number. Then, an evaluation was performed.

(Composition Analysis Inside Active Material)

Regarding the test electrode obtained in Example 1, the electrode was made to be flaky by an ion milling method. After that, an observation and an analysis were performed by a TEM-EDX method. Elementary composition of a material positioned around the silicon oxide in the negative electrode active material was examined. As a result, Si/O and Si/C (molar ratio) were obtained. Three points were measured and then the average thereof was defined as the elementary composition. The measurement was performed in conditions including an acceleration voltage of 200 kV and a beam diameter of approximately 1 nm, using H-9000NAR (TEM) manufactured by Hitachi High-Technologies Corporation and HF-2000 (EDX) manufactured by Hitachi High-Technologies Corporation.

Only sections in examples and comparative examples below different from those in Example 1 will be described. Since other composition and evaluation processes were performed similarly to Example 1, the descriptions thereof will be omitted.

Example 2

Example 2 is different from Example 1 in that tetraethyl orthosilicate in an amount of 1.5 g was used. A negative electrode active material according to Example 2 was manufactured by a method the same as that according to Example 1.

Example 3

Example 3 is different from Example 1 in that tetraethyl orthosilicate in an amount of 12 g was used. A negative electrode active material according to Example 3 was manufactured by a method the same as that according to Example 1.

Example 4

A negative electrode active material according to Example 4 was obtained in the following conditions. Tetraethyl orthosilicate in amount of 2 g, furfuryl alcohol in an amount of 5 g, and ethanol in an amount of 20 g together with YSZ balls (0.2 mm) were added to nano-sized silicon powder with an average primary grain diameter of 22 nm in an amount of 1.2 g. Then, a planetary-typed ball mill apparatus performed mixing. Liquid mixed in an amount of 1.0 g with the ratios of hydrochloric acid, water, ethanol that are 2, 2, and 1, respectively, by mass ratio, was added to liquid separated from the YSZ balls by a suction filtration method. Then, the mixture and a stirring bar were put into a glass container and then the glass container was well closed. After that, a stirrer rotated the stirring bar and performed stirring to the mixture being heated at 80° C. for seven hours. After that, the mixture was left at room temperature for one week so as to be dehydrated and solidified. The obtained solidified material was retained and calcined at 1100° C. for three hours under an atmosphere of Ar. The calcined material was pulverized with an agate-made mortar. A negative electrode active material of −45 μm was obtained by sieving.

Comparative Example 1

Comparative Example 1 is different from Example 1 in that tetraethyl orthosilicate was not used. A negative electrode active material according to Comparative Example 1 was manufactured by a method the same as that according to Example 1.

Comparative Example 2

Comparative Example 2 is different from Example 1 in that tetraethyl orthosilicate in an amount of 0.8 g was used. A negative electrode active material according to Comparative Example 2 was manufactured by a method the same as that of Example 1.

Comparative Example 3

Comparative Example 3 is different from Example 4 in that tetraethyl orthosilicate was not used. A negative electrode active material according to Comparative Example 3 was manufactured by a method the same as that according to Example 4.

FIG. 1 illustrates a TEM observation result according to Example 1. Regions with a length of a few 100 nm, indicated with a deep color are silicon-containing particles. EDX experiment was performed to three points indicated with a black circle in a region around the regions, indicated with a light color. As a result, the average of Si/O (molar ratio) was 1.9. The average of Si/C (molar ratio) was 0.019. Meanwhile, a point indicated with a square in the figure was measured by EDX. As a result, Si/O (molar ratio) was 0.65 and Si/C (molar ratio) was 1.5. The TEM observation result also includes a point out of a preferable range. However, as already described above, the TEM observation result also includes a point in the preferable range. Thus, the three points indicated with the black circle were selected except the point out of the preferable range. A material indicating a deep color the same as those of the silicon-containing particles was observed at the point indicated with the square. It was thought that a part of the silicon-containing particles or a part of a material of a precursor thereof separated due to pulverization or detachment upon mixing of raw materials was included. This point was not included in determination of whether a material around the silicon-containing particles was an Si—O—C mixed body. Note that two points indicated with a white circle in FIG. 1 were measured by EDX. As a result, the average of Si/O (molar ratio) was 0.81. The average of Si/C (molar ratio) was 2.4. These two points were inside the silicon-containing particles. The values at the two points were not measurement values of the Si—O—C mixed body. Similarly to Example 1, observations and measurements were performed to Examples 2, 3, and 4, and Comparative Examples 1, 2, and 3, and results thereof are collectively shown in Table 1. Simultaneously, results of a charge and discharge test are also described.

TABLE 1

| | Si/O | Si/C | INITIAL DISCHARGE CAPACITY | 80% CAPACITY RETENTION CYCLE CYCLE NUMBER |
|---|---|---|---|---|
| EXAMPLE 1 | 1.9 | 0.019 | 1090 mAh/g | 532 TIMES |
| EXAMPLE 2 | 4.5 | 0.004 | 1121 mAh/g | 400 TIMES |
| EXAMPLE 3 | 0.8 | 0.091 | 1050 mAh/g | 578 TIMES |
| EXAMPLE 4 | 1.1 | 0.066 | 1304 mAh/g | 458 TIMES |
| COMPARATIVE EXAMPLE 1 | * | 0 | 1125 mAh/g | 313 TIMES |
| COMPARATIVE EXAMPLE 2 | 6.2 | 0.001 | 1122 mAh/g | 315 TIMES |
| COMPARATIVE EXAMPLE 3 | * | 0 | 1231 mAh/g | 256 TIMES |

* Both Si and O were not detected.

It was found that the Si—O—C mixed body was around the silicon-containing particles in Examples 1, 2, 3, and 4. Meanwhile, only a C atom was detected in Comparative Examples 1 and 3. It was found that hard carbon was around the silicon-containing particles. In comparison to Comparative Examples 1 and 2, the initial discharge capacity slightly decreased in the charge and discharge characteristics in each of Examples 1, 2, and 3 in which silicon monoxide was selected as a raw material of the silicon-containing particles and the Si—O—C mixed body was formed. However, it was found that large improvement was observed in the cycle characteristics. In Example 4 in which the nano-sized silicon particles were selected as the raw material of the silicon-containing particles and the Si—O—C mixed body was formed, the initial discharge capacity was substantially the same, in comparison to Comparative Example 3. However, it was found that large improvement was observed in the cycle characteristics.

In the present specification, some of the elements are denoted with only atomic symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material for a nonaqueous electrolyte battery, comprising a complex, the complex including:
    a covering material including an Si—O—C mixed body; and
    particles consisting of silicon and/or silicon oxide,
    wherein the Si—O—C mixed body consists of three elements of Si, O, and C, the Si—O—C mixed body including a point at which the following conditional expressions are simultaneously satisfied:

$0.6 \leq Si/O \leq 5$ (molar ratio)

$0.002 \leq Si/C \leq 0.1$ (molar ratio)

the mixed body consists of the three elements of Si, O, and C in a region excluding the particles when elementary composition analysis of the complex is performed by TEM-EDX with a beam diameter of 1 nm.

2. The material according to claim 1,
    wherein the Si—O—C mixed body is amorphous.

3. The material according to claim 1,
    wherein the three elements of Si, 0, and C of the Si—O—C mixed body are mixed in an atomic state.

4. The material according to claim 1,
    wherein the covering material further includes a carbonaceous substance.

5. The material according to claim 1, wherein the Si—O—C mixed body satisfies the following conditional expression:

$0.8 \leq Si/O \leq 4.5$ (molar ratio).

6. The material according to claim 1, wherein the Si—O—C mixed body satisfies the following conditional expression:

$0.004 \leq Si/C \leq 0.091$ (molar ratio).

7. An electrode for a nonaqueous electrolyte battery, comprising:
    a collector; and
    a mixture layer including the active material for a nonaqueous electrolyte battery according to claim 1 and a binder, on the collector.

8. A nonaqueous electrolyte secondary battery comprising:
    an exterior material;
    a positive electrode housed in the exterior material;
    a negative electrode spatially apart from the positive electrode, the negative electrode being housed in the exterior material with a separator interposed between the negative electrode and the positive electrode, the negative electrode including the electrode according to claim 1; and
    a nonaqueous electrolyte filled in the exterior material.

9. A battery pack comprising the nonaqueous electrolyte secondary battery according to claim 8.

10. A vehicle comprising the battery pack according to claim 8.

11. The material according to claim 1, wherein a volume ratio of the particles to the covering material is larger than 0.33 and is smaller than 2.5.

12. The material according to claim 1, wherein the covering material further includes lithium silicate.

13. The material according to claim 1, wherein the particles consist of silicon.

14. The material according to claim 1, wherein the particles consist of silicon oxide.

15. The material according to claim 1, wherein the particles consist of silicon and silicon oxide.

16. The material according to claim 1, wherein an average primary grain diameter of the active material is 1 μm or more to 80 μm or less.

17. The material according to claim 1, wherein an average primary grain diameter of the active material is 10 μm or more to 60 μm or less.

* * * * *